United States Patent [19]
Shuert

[11] Patent Number: 5,993,724
[45] Date of Patent: Nov. 30, 1999

[54] METHOD OF FORMING NON-SKID PLASTIC PALLET

[75] Inventor: Lyle H. Shuert, 70 Kingsley Manor Dr., Bloomfield Hills, Mich. 48304

[73] Assignee: Lyle H. Shuert

[21] Appl. No.: 09/002,095

[22] Filed: Dec. 31, 1997

[51] Int. Cl.[6] .................................................. B29C 51/10
[52] U.S. Cl. .......................... 264/545; 156/292; 264/248; 264/296; 425/504; 425/515
[58] Field of Search .................................... 264/545, 553, 264/296, 322, 248; 156/292; 425/503, 504, 515

[56] References Cited

U.S. PATENT DOCUMENTS

| | | | |
|---|---|---|---|
| 3,444,034 | 5/1969 | Hewett | 264/545 |
| 4,606,278 | 8/1986 | Shuert | 108/51.1 |
| 4,692,364 | 9/1987 | Altus | 428/85 |
| 4,879,956 | 11/1989 | Shuert . | |
| 5,042,396 | 8/1991 | Shuert . | |
| 5,108,529 | 4/1992 | Shuert . | |
| 5,112,560 | 5/1992 | Oumdjian | 156/292 |
| 5,390,467 | 2/1995 | Shuert . | |
| 5,391,251 | 2/1995 | Shuert . | |
| 5,401,347 | 3/1995 | Shuert | 264/545 |
| 5,470,641 | 11/1995 | Shuert . | |

Primary Examiner—Jan H. Silbaugh
Assistant Examiner—Dae Young Lee
Attorney, Agent, or Firm—Young & Basile PC

[57] ABSTRACT

A first mold is provided having a first molding surface including a flat primary surface area, a plurality of spaced leg areas within the primary surface area, and a plurality of pin holes in the primary surface area positioned between the leg areas; and a second mold is provided having a second molding surface including a flat primary surface area, a plurality of leg areas in the primary surface area corresponding to the leg areas in the primary surface area of the first molding surface, and a plurality of spaced knitting surfaces relieved from the general plain of the primary surface area, positioned between the leg areas, and corresponding to respective pin holes in the primary surface area of the first molding surface. A first plastic sheet is thermoformed to the first molding surface to conform the first plastic sheet to the primary surface area and the leg areas of the first molding surface and position the sheet in overlying relation to the pin holes. A second plastic sheet is thermoformed to the second molding surface to conform the second plastic sheet to the primary surface area, the leg areas, and the knitting areas of the second molding surface. The molds are brought together to bring respective knitting surfaces of the second molding surface into proximity with respective pin holes in the first molding surface and the molds are thereafter pressed together to force plastic material into and fill the pin holes in the first molding surface.

8 Claims, 5 Drawing Sheets

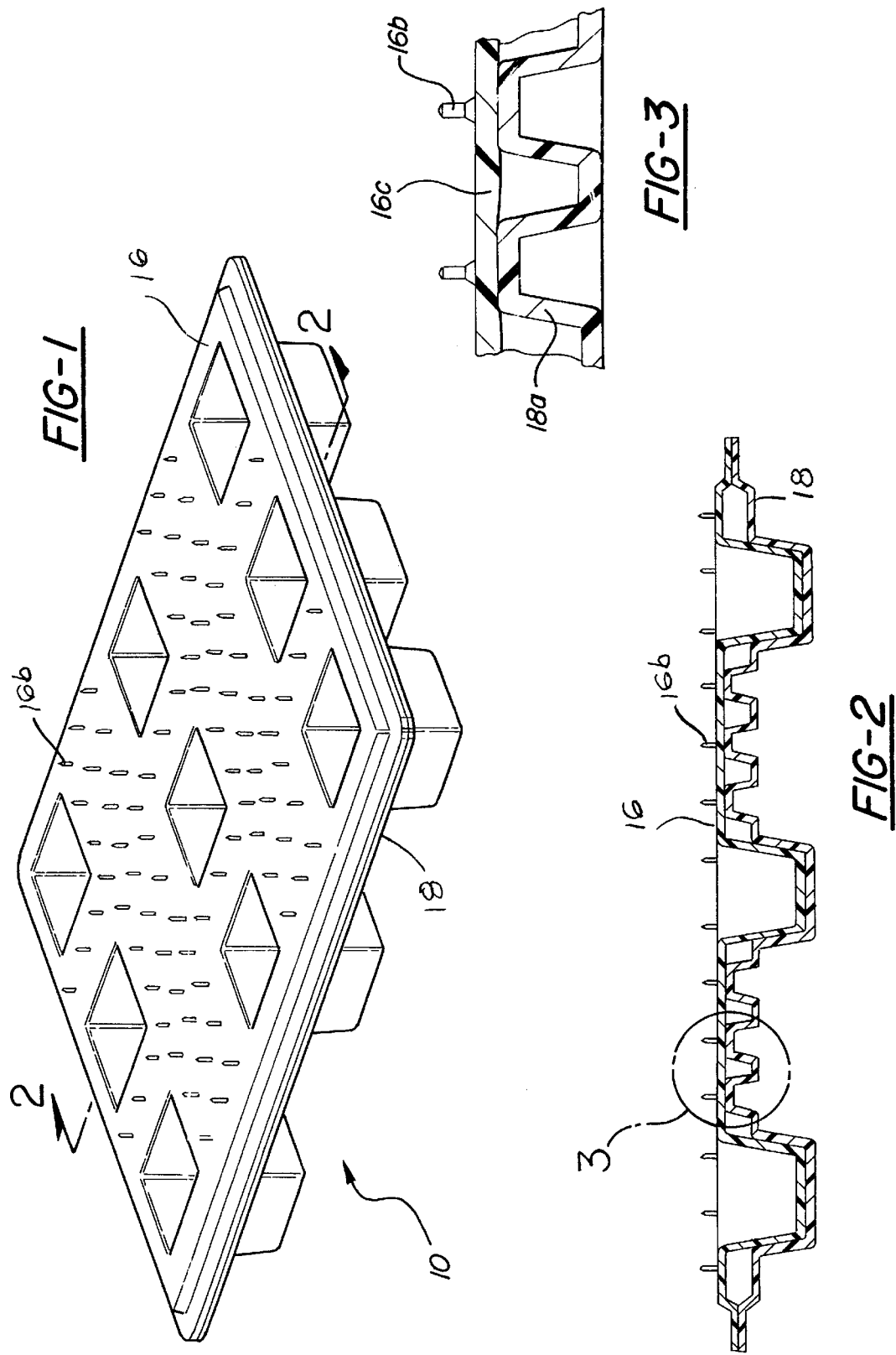

METHOD OF FORMING NON-SKID PLASTIC PALLET

BACKGROUND OF THE INVENTION

This invention relates to shipping and storage pallets and more particularly to plastic pallets embodying a twin sheet construction.

Pallets have traditionally been formed of wood. Wood pallets, however, have many disadvantages. For example, they are subject to breakage and thus are not reusable over an extended period of time. Wood pallets also take up a considerable amount of valuable floor space in the warehouse when they are not in use. In an effort to solve some of the problems associated with wood pallets, plastic pallets have been developed and employed with some degree of success. In one generally successful form of plastic pallet design upper and lower plastic sheets are formed in separate molding operations and the two sheets are then selectively fused or knitted together in a suitable press to form a reinforced double wall or "twin sheet" structure. These twin sheet plastic pallets, although more durable than the wooden pallets that they replace, tend to have a relatively slippery platform surface so that articles placed on the pallet tend to inadvertently slide off of the pallet or inadvertently shift their position on the pallet surface.

SUMMARY OF THE INVENTION

This invention is directed to a method of forming a plastic pallet of twin sheet design which provides a support surface having excellent anti-skid characteristics.

The invention methodology has applicability in the formation of twin sheet plastic articles, the formation of twin sheet plastic panels, and the formation of twin sheet plastic pallets.

In its broadest form, the method comprises providing a first mold having a first molding surface including a large generally planar feature and a plurality of detail features within the large planar feature; providing a second mold having a second molding surface including surface areas corresponding spatially to the detail features of the first molding surface; thermoforming a first plastic sheet to the first molding surface to conform the first sheet to the large generally planar feature; thermoforming a second plastic sheet to the second molding surface; and bringing the molds together to bring respective surface areas of the second molding surface into proximity with respective detail features of the first molding surface and thereafter pressing the molds together to force plastic material into conformity with the detail features. This methodology allows the twin sheet thermoforming process to be employed to provide detail features on the surface area of a twin sheet article, such for example, as a textured anti-skid feature on an article surface area.

According to further feature of the invention, the generally planar feature comprises a large area flat surface; the detail features comprise a plurality of small spaced pockets in the flat surface; and the surface areas of the second molding surface comprise spaced individual areas which are relieved with respect to the general plain of the second molding surface and which knit to the first plastic sheet at the pockets in the first molding surface and act to force plastic material into the pockets to fill the pockets. This methodology allows detail features to be formed on a thermoformed twin sheet article wherever knitting occurs between the first and second sheets.

According to further feature of the invention, the first sheet defines an upper support surface in the finished article and the pockets define pinholes in the first molding surface so that the filled pockets define pins upstanding from the upper support surface of the finished article. This methodology allows the formation of a plurality of spaced anti-skid pins in a support surface of a thermoformed twin sheet plastic article.

According to further feature of the invention, the spaced individual areas of the second molding surface are defined by spaced knob structures upstanding from the general plain of the second molding surface. With this arrangement, an anti-skid pin may be formed on the upper support surface in opposition to each knob structure.

The methodology also provides a method of forming a twin sheet plastic panel. According to the panel forming methodology, a first mold is provided having a first molding surface including a large flat primary surface and a plurality of spaced small pockets in the primary surface; a second mold is provided having a second molding surface including a large flat primary surface and a plurality of small knitting surfaces relieved from the general plain of the primary surface; a first plastic sheet is thermoformed to the first molding surface to conform the first sheet to the primary surface of the first molding surface; a second plastic sheet is thermoformed to the second molding surface to conform the second sheet to the primary surface and the knitting surfaces of the second molding surface; and the molds are brought together to bring respective knitting surfaces of the second molding surface into proximity with respective pockets in the first molding surface whereafter the molds are pressed together to force plastic material into and fill the pockets in the first molding surface. This methodology allows the twin sheet thermoforming process to be readily employed to form a panel having a textured or anti-skid surface.

The invention methodology is also applicable to the formation of a twin sheet plastic pallet. In this application, the method comprises providing a first mold having a first molding surface including a flat primary surface area, a plurality of spaced leg areas within the primary surface area, and a plurality of pin holes in the primary surface area positioned between the leg areas; providing a second mold having a second molding surface including a flat primary surface area, a plurality of leg areas in the primary surface area corresponding to the leg areas in the primary surface area of the first molding surface, and a plurality of spaced knitting surfaces relieved from the general plain of the primary surface area, positioned between the leg areas, and corresponding to respective pin holes in the primary surface area of the first molding surface; thermoforming a first plastic sheet to the first molding surface to conform the first plastic sheet to the primary surface area and the leg areas of the first molding surface and position the sheet in overlying relation to the pin holes; thermoforming a second plastic sheet to the second molding surface to conform the second plastic sheet to the primary surface area, the leg areas, and the knitting areas of the second molding surface; and bringing the molds together to bring respective knitting surfaces of the second molding surface into proximity with respective pockets in the first molding surface and thereafter pressing the molds together to force plastic material into and fill the pin holes in the first molding surface. This methodology allows the twin sheet thermoforming process to be readily employed to form a pallet having an upper support surface including a plurality of upstanding pins providing an anti-skid characteristic for the pallet.

BRIEF DESCRIPTION OF THE DRAWINGS

FIG. 1 is a perspective view of a pallet according to the invention;

FIG. 2 is a cross-sectional view taken on line 2—2 of FIG. 1;

FIG. 3 is a detailed view within the circle 3 of FIG. 2;

DETAILED DESCRIPTION OF THE PREFERRED EMBODIMENT

The plastic pallet shown in FIG. 1 is of the twin sheet type in which upper and lower plastic sheets are individually thermoformed and brought together to form the pallet. The pallet is formed according to the invention utilizing an upper mold 12, a lower mold 14, an upper plastic sheet 16, and a lower plastic sheet 18.

Figure 11:
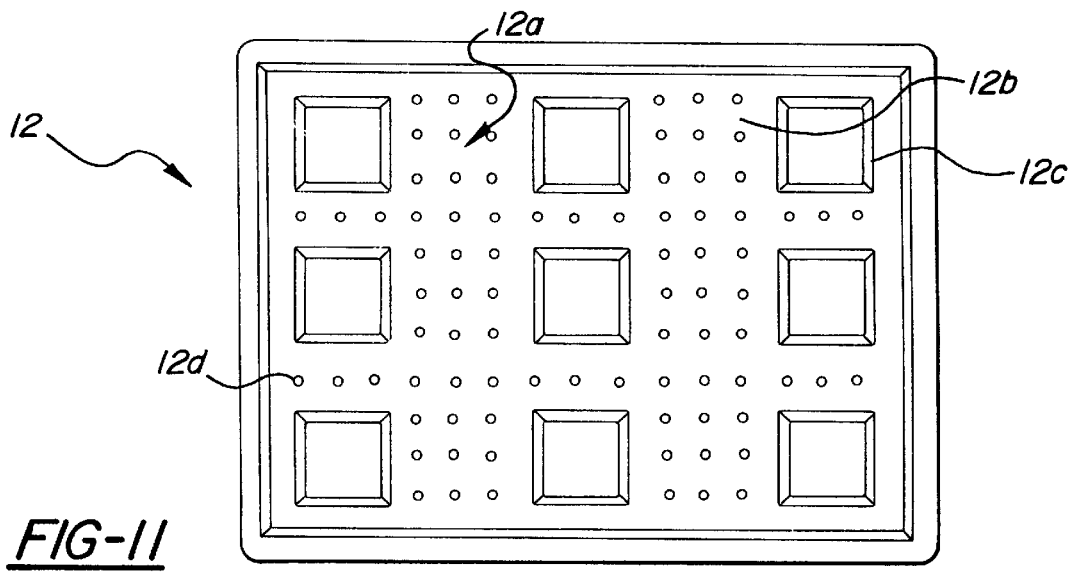
FIG. 11 is a bottom view of an upper mold utilized in the invention methodology.
Figure 12:
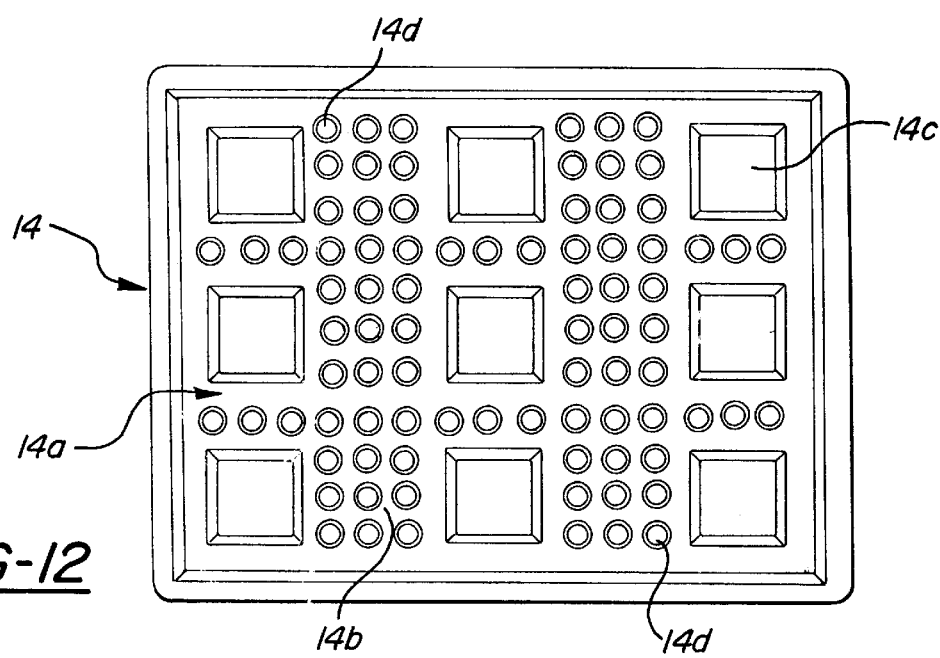
FIG. 12 is a top view of a lower mold utilized in the invention methodology.

Upper mold 12 is formed of a metallic material and has a generally rectangular configuration as seen in FIG. 11. A molding surface 12a is provided on the under surface of the mold. Surface 12a defines a generally planar primary mold surface 12b, a plurality of spaced leg forming surfaces 12c downstanding from and positioned within primary surface 12b, and a plurality of pockets or pin holes 12d within primary surface area 12b and between leg areas 12c. Normally nine leg areas 12c are provided to form a nine-legged pallet including eight peripherally spaced legs and a central leg.

Figure 7:
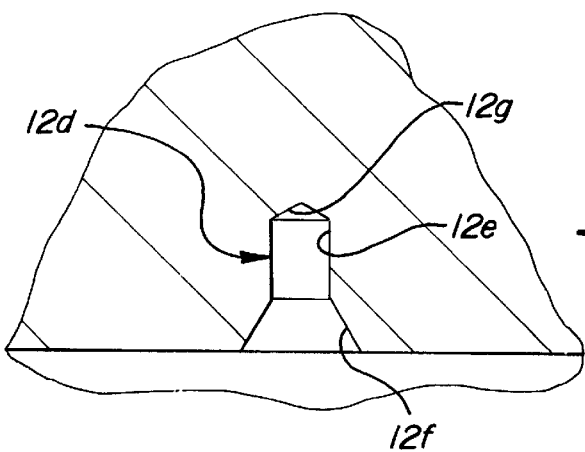
FIGS. 7, 8, 9 and 10 are detail views showing successive steps in the invention methodology.

The number, spacing, and size of the pin holes 12d will vary depending on the particular application. Each pin hole 12d, as best seen in FIG. 7, is formed as a drilled and counter bored hole in the lower surface of the upper mold and includes a main body cylindrical portion 12e, a counter conical entry portion 12f, and a conical blind end portion 12g formed by the pointed tip of the boring tool. In overview, primary surface area 12b will be seen to comprise a large generally planar feature and the holes or pockets 12d will be seen to comprise a plurality of detail features within the large feature defined by surface 12b.

Lower mold 14 is formed of a metallic material and has a generally rectangular configuration corresponding generally to the configuration of upper mold 12. Lower mold 14 defines an upper molding surface 14a including a large generally planar primary molding surface 14b, a plurality of spaced leg forming cavity areas 14c positioned within primary surface 14b and corresponding in configuration and spacing to the leg forming areas 12c on the molding surface of the upper mold, and a plurality of bosses 14d upstanding from primary surface 14b between leg surfaces 14c. Bosses 14d may correspond in number and spacing to pin holes 12d or there may be less pin holes than there are bosses.

Figure 4:
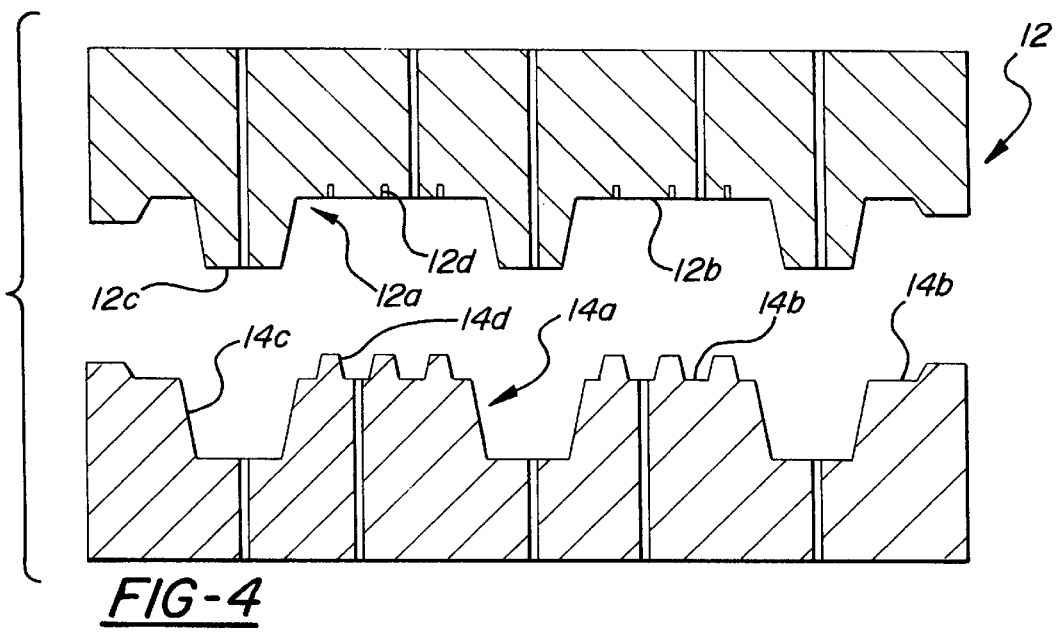
FIGS. 4, 5 and 6 are cross-sectional views showing successive steps in the invention methodology.
Figure 5:
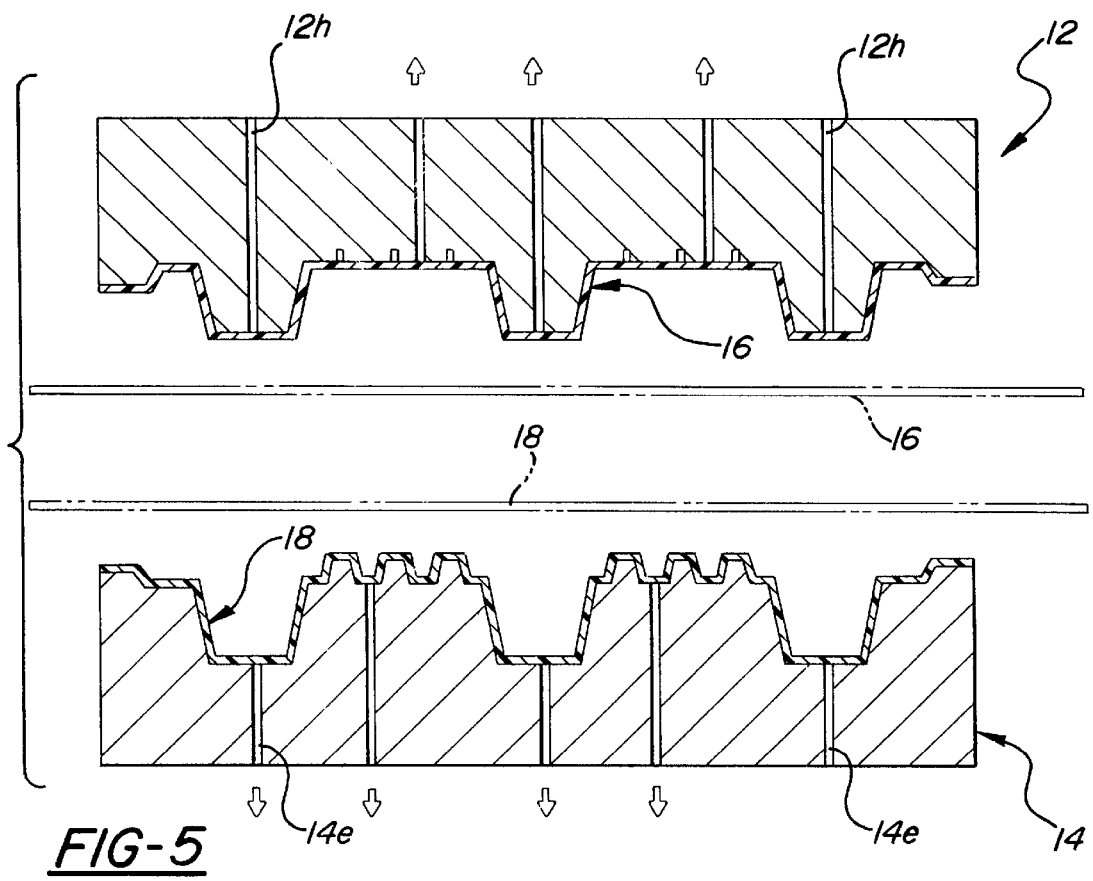
Figure 8:
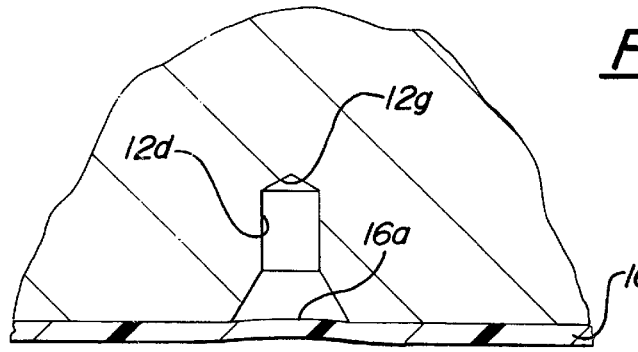

Upper plastic sheet 16 is heated in known manner, positioned beneath the upper mold as seen by the dash lines in FIG. 5, and thereafter sucked upwardly into conformity with the molding surface 12a utilizing vacuum supplied to surface 12a through vacuum ports 12h. Specifically, heated sheet 16 is sucked upwardly during the thermoforming process into conformity with leg areas 12c and primary surface area 12b. However, since the pressure applied to the sheet during the thermoforming process is limited to atmospheric pressure, the plastic material of the sheet does not flow upwardly into the small pockets 12d but rather, as best seen in FIG. 8, assumes a position in overlying relation to the pin holes with perhaps a slight bulging tendency seen at 16a in which the plastic material of the sheet achieves a slight incipient entry into the pin hole under the bias of the vacuum pressure.

Figure 9:
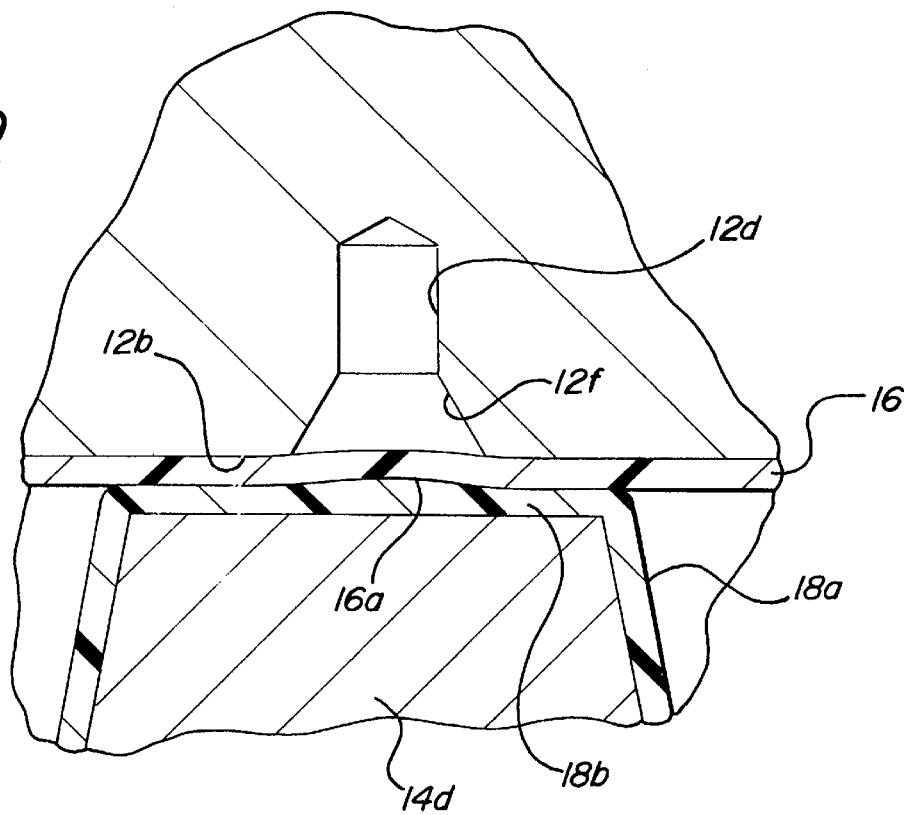

Lower plastic sheet 18 is heated in known manner and then brought, as seen in dash lines and in FIG. 5, into overlying relation with lower mold 14, whereafter vacuum is supplied to the mold surface 14a utilizing vacuum ports 14e to suck the heated sheet downwardly into conformance with molding surface 14a and, specifically, to suck the heated sheet downwardly into the leg cavity areas 14c, into conformance with primary molding surface 14b, and into conformance with knobs 14d. The knobs are spaced far enough apart and have a large enough configuration such that the atmospheric pressure generated in the vacuum forming operation is sufficient to provide complete conformity of the sheet 18 to the total contour of the upstanding knobs, as best seen in FIG. 9. Specifically, sheet 18 forms totally around each knob to form an annular conical sheet wall 18a around each knob and a top sheet wall 18b above each knob.

Whereas the plastic material utilized to form the invention pallet is not critical it has been found that excellent results may be obtained by the use of a high density polyethylene having a density of approximately 0.95 grams per cubic centimeter.

Figure 6:
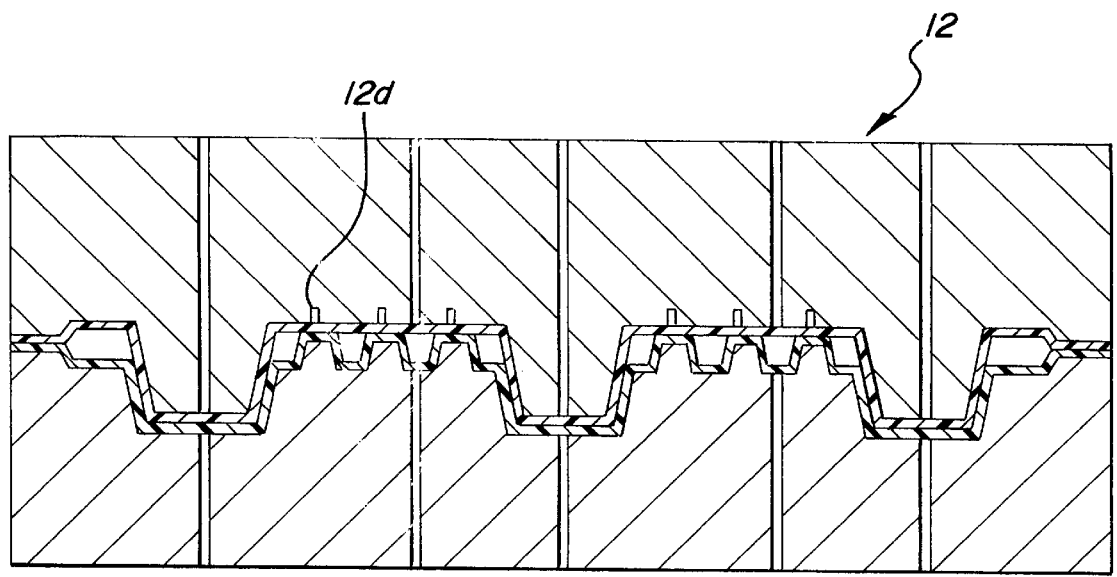
Figure 10:
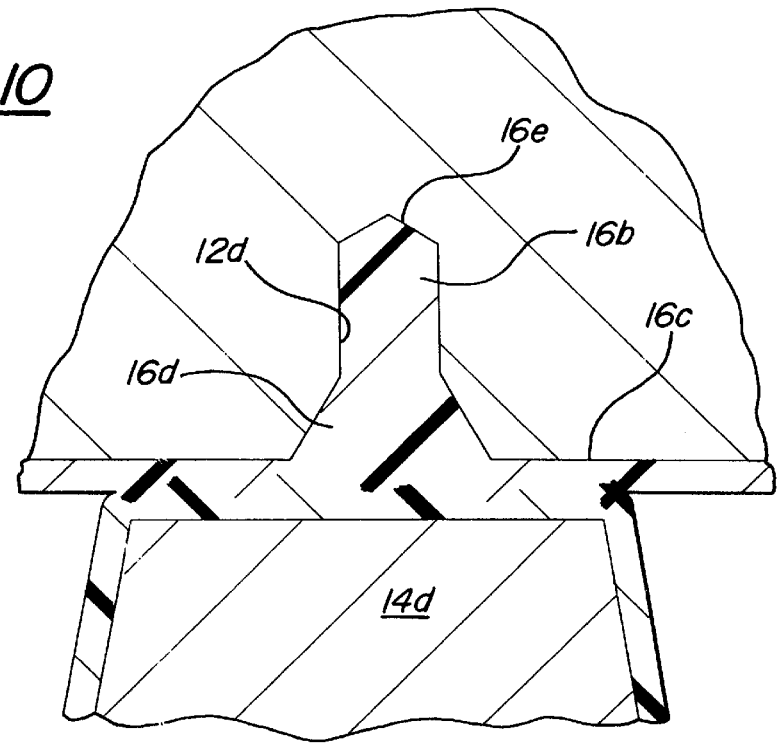

Following the thermoforming of upper sheet 16 to molding surface 12a and lower sheet 18 to molding surface 14a, and while the sheets are still in a heated flowable state, the upper and lower molds are brought together, as seen in FIG. 6, utilizing a suitable press device (not shown) such as air bags, hydraulic cylinders or the like. As the upper mold is brought into proximity with the lower mold the knobs 14d of the lower mold are brought into proximity with the respective pin holes 12d in the upper mold. FIG. 9 illustrates the configuration of the sheets as the top sheet walls 18b initially contact or "kiss" the molding surface 16a defined by the thermoformed upper sheet 16 proximate a pin hole 12d. Upon further movement of the molds together under the high forces generated by the associated press, plastic material of the upper sheet 16 underlying each pocket 12d is extruded or forced upwardly by the opposed knob 14d into the pocket to totally fill the pocket whereby to form, as best seen in FIG. 10, a pin or tit 16b projecting upwardly from the upper surface 16c of the upper sheet 16. As noted, the tit will be formed only where the pin hole 12d is opposed by a knob 14d. That is, a pin will be formed only where knitting is occurring between the upper and lower sheets so that the extremely high pressures generated by the associated press to accomplish the knitting is brought to bear at the pin hole location to extrude or force plastic material upwardly into the pin hole. For example, whereas only atmospheric pressure (14.7 psi) is available to conform upper sheet 16 to molding surface 12a during the initial thermoforming of the sheet to the molding surface, the pressures available during the fusing or knitting process, as provided by the associated press, far exceed atmospheric pressure and may for example constitute as much as 1,000 psi.

In overview, it will be seen that the initial thermoforming of the sheets to the mold surfaces conforms the upper sheet to the large generally planar feature of the upper molding surface such as the large planar surface 12b and the subsequent knitting of the upper and lower sheets under the impetus of the associated press forces the plastic material of the upper sheet into conformity with detail features on the molding surface of the upper mold such as the pin holes 12d.

The entry conical configuration 12f of each pin hole 12d strengthens the tit or pin 16b formed by the pin hole by providing a large diameter base 16d for the pin and further acts as a funnel to insure that an adequate amount of plastic material is fed into the pin hole during the knitting process to insure total filling of the pin hole. The conical blind bore portion 12g facilitates formation of the pin holes in a boring operation utilizing a pointed boring tool and further provides a point 16e on each pin 16b to augment the anti-skid aspect provided by the pins. In order to insure an adequate knitting of the upper and lower plastic sheets and to insure adequate flow of plastic material into the pin holes, the vertical height or space between the lower molding surface 12b of the upper mold and the surface defined by the tops of the knobs 14d that is present when the upper and lower sheets initially kiss (as seen in FIG. 9) is reduced to approximately half of the initial vertical space during the final knitting or fusing operation (as seen in FIG. 10).

As noted, although it is necessary that knitting take place opposite a pin hole 12d to insure extrusion of plastic material into the pin hole to form the pin, a pin hole need not be formed in opposition to each knob 14d and in fact there may be applications where only a selected few of knobs 14d are utilized to form a pin in association with a pin hole. Accordingly, there may be far fewer pin holes provided in the upper molding surface than there are knobs provided on the lower molding surface.

Figure 13:
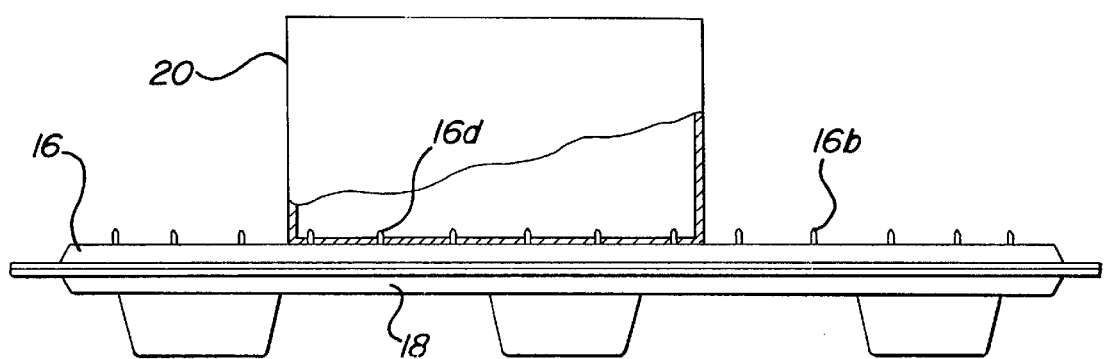
FIG. 13 illustrates the manner in which a pallet constructed in accordance with the invention methodology acts to provide an anti-skid characteristic for the pallet.

The operation of the pallet formed by the invention methodology to provide an anti-skid characteristic for the pallet is seen in FIG. 13 wherein a corrugated cardboard box 20 is seen placed on the upper surface of the pallet in overlying relation to a plurality of upstanding pins 16b. Due to the pointed configuration of the pins and the pin rigidity provided by the large area base of each pin, it has been found that the pins readily pierce the corrugated cardboard lower wall of the carton 20 to impale the carton on the pins and preclude inadvertent slippage of the carton off of the pallet and/or undesirable shifting of the lateral position of the carton on the pallet.

The invention methodology will be seen to provide a means whereby the twin sheet thermoforming operation may be utilized for forming articles, such as panels or pallets, having not only the large generally planar features characteristic of thermoformed articles but also exquisitely formed detail features, within the large area planar features, of the type that would normally be available only in methodologies such as high pressure injection molding.

Whereas a preferred embodiment of the invention methodology has been illustrated and described in detail, it will be apparent that various changes may be made in the disclosed embodiment without departing from the scope or spirit of the invention.

I claim:

1. A method of forming a twin sheet plastic article comprising;
    providing a first mold having a first molding surface including a large generally planar feature and a plurality of detail features within the large feature;
    providing a second mold having a second molding surface including surface areas corresponding spatially to the detail features of the first molding surface;
    thermoforming a first plastic sheet to the first molding surface with a thermoform pressure sufficient to provide conformance of a planar surface of the first sheet to the large generally planar feature but insufficient to provide conformance of the planar surface of the first sheet to the detail features;
    thermoforming a second plastic sheet to the second molding surface;
    bringing the molds together to bring the thermoformed first and second sheets together and bring respective surface areas of the second molding surface into proximity with respective detail features of the first molding surface; and
    thereafter pressing the molds together to force the thermoformed first and second sheets together and force plastic material into conformity with the detail features to form relieved areas on the planar surface of the first sheet providing an anti-skid characteristic for the planar surface.

2. A method according to claim 1 wherein;
    the generally planar feature comprises a large area flat surface;
    the detail features comprise a plurality of small spaced pockets in the flat surface; and
    the surface areas of the second molding surface comprise spaced individual areas which are relieved with respect to the general plane of the second molding surface and which knit to the first plastic sheet at the pockets in the first molding surface and act to force plastic material into the pockets to fill the pockets.

3. A method according to claim 2 wherein; the planar surface of the first sheet defines an upper support surface in the finished article; and
    the pockets define pin holes in the first molding surface so that the filled pockets define pins upstanding from the upper support surface of the finished article.

4. A method according to claim 3 wherein the spaced individual areas of the second molding surface are defined by spaced knob structures outstanding from the general plane of the second molding surface.

5. A method of forming a twin sheet plastic panel comprising;
    providing a first mold having a first molding surface including a large flat primary surface and a plurality of spaced small pockets in the primary surface;
    providing a second mold having a second molding surface including a large flat primary surface and a plurality of small knitting surfaces relieved from the general plane of the primary surface;
    thermoforming a first plastic sheet to the first molding surface with a thermoformed pressure sufficient to provide conformance of a planar surface of the first sheet to the primary surface of the first molding surface but insufficient to provide conformance of the planar surface of the first sheet to the pockets;
    thermoforming a second plastic sheet to the second molding surface to conform the second sheet to the primary surface of the second molding surface and to the knitting surfaces of the second molding surface;
    bringing the molds together to bring the thermoformed first and second sheets together and bring respective knitting surfaces of the second molding surface into proximity with respective pockets in the first molding surface; and
    thereafter pressing the molds together to force plastic material into and fill the pockets in the first molding surface to form relieved areas on the planar surface of the first sheet providing an anti-skid characteristic for the planar surface.

6. A method according to claim 5 wherein;

the plane surface of the first sheet defines an upper surface in the finished panel; and the pockets define pin holes in the primary surface of the first molding surface so that the filled pockets define pins upstanding from the upper surface of the finished panel.

7. A method according to claim 6 wherein the small knitting surfaces of the second molding surface are defined by spaced knob structures upstanding from the general plain of the primary surface of the second molding surface.

8. A method of forming a twin sheet plastic pallet comprising;

providing a first mold having a first molding surface including a flat primary surface area, a plurality of spaced leg areas within the primary surface area, and a plurality of pin holes in the primary surface area positioned between the leg areas;

providing a second mold having a second molding surface including a flat primary surface area, a plurality of leg areas in the primary surface area corresponding to the leg areas in the primary surface area of the first molding surface, and a plurality of spaced knitting surfaces relieved from the general plain of the primary surface area, positioned between the leg areas, and corresponding to respective pin holes in the primary surface area of the first molded surface;

thermoforming a first plastic sheet to the first molding surface with a thermoform pressure sufficient to provide conformance of a planar surface of the first plastic sheet to the primary surface area and the leg areas of the first molding surface but insufficient to provide conformance of the planar surface of the first plastic sheet to the pin holes;

thermoforming a second plastic sheet to the second molding surface to conform the second plastic sheet to the primary surface area, the leg areas, and the knitting areas of the second molding surfaces;

bringing the molds together to bring the thermoformed first and second sheets together and bring the respective knitting surfaces of the second molding surface into proximity with respective pin holes in the first molding surfaces; and thereafter pressing the molds together to force plastic material into and fill the pin holes in the first molding surface to form Pins on the planar surface of the first sheet providing an anti-skid characteristic for the planar surface.

\* \* \* \* \*